United States Patent
Wills et al.

(10) Patent No.: US 12,071,536 B2
(45) Date of Patent: Aug. 27, 2024

(54) BIMODAL SILICONE-ACRYLIC POLYMER PARTICLES

(71) Applicants: Rohm and Haas Company, Collegeville, PA (US); Dow Silicones Corporation, Midland, MI (US)

(72) Inventors: Morris Wills, Philadelphia, PA (US); Hailan Guo, Warrington, PA (US); Nanguo Liu, Midland, MI (US); Jeffrey Rastello, Saginaw, MI (US)

(73) Assignees: Rohm and Haas Company, Collegeville, PA (US); Dow Silicones Corporation, Midland, MI (US)

( * ) Notice: Subject to any disclaimer, the term of this patent is extended or adjusted under 35 U.S.C. 154(b) by 733 days.

(21) Appl. No.: 17/259,639

(22) PCT Filed: Jul. 26, 2019

(86) PCT No.: PCT/US2019/043554
§ 371 (c)(1),
(2) Date: Jan. 12, 2021

(87) PCT Pub. No.: WO2020/023818
PCT Pub. Date: Jan. 30, 2020

(65) Prior Publication Data
US 2021/0324187 A1    Oct. 21, 2021

Related U.S. Application Data

(60) Provisional application No. 62/711,147, filed on Jul. 27, 2018.

(51) Int. Cl.
C08L 25/12      (2006.01)
C08F 285/00    (2006.01)

(52) U.S. Cl.
CPC ............ *C08L 25/12* (2013.01); *C08F 285/00* (2013.01); *C08L 2205/03* (2013.01); *C08L 2207/53* (2013.01)

(58) Field of Classification Search
CPC combination set(s) only.
See application file for complete search history.

(56) References Cited

U.S. PATENT DOCUMENTS 4,994,522 A    2/1991   Sasaki et al.
7,153,899 B2   12/2006  Reddy et al.
(Continued)

FOREIGN PATENT DOCUMENTS

CN    107151296    9/2017
EP    1719787      11/2006
(Continued)

*Primary Examiner* — Anthony J Frost
(74) *Attorney, Agent, or Firm* — Brian L. Mutschler

(57) ABSTRACT

Provided is a collection of polymer particles comprising
(I) a plurality of acrylic particles (I) each comprising
  (a) an acrylic core polymer (Ia) comprising
    (i) polymerized units of one or more monovinyl acrylic monomers (Iai),
    (ii) polymerized units of one or more Si-free graftlinkers (Iaii),
  (b) a shell polymer (Ib),
(II) a plurality of hybrid polymer particles (II), each comprising
  (a) a core polymer (IIa) comprising
    (i) polymerized units of one or more silicon-containing monomers (IIai);
    (ii) optionally, polymerized units of one or more monovinyl acrylic monomers (IIaii); and
    (iii) polymerized units of one or more Si-free graftlinkers (IIaiii);
  (b) a shell polymer (IIb) comprising polymerized units of one or more acrylic monomers (IIb).

5 Claims, 2 Drawing Sheets

(56) References Cited

U.S. PATENT DOCUMENTS

| | | |
|---|---|---|
| 8,013,063 B2 | 9/2011 | Lee et al. |
| 10,174,195 B2 | 1/2019 | Nakamoto et al. |
| 2007/0021557 A1 | 1/2007 | Lee et al. |
| 2007/0167567 A1 | 7/2007 | Hashimoto et al. |
| 2012/0264871 A1 | 10/2012 | Moon et al. |
| 2015/0125500 A1* | 5/2015 | Watanabe .............. A61Q 19/00 424/401 |
| 2016/0251510 A1* | 9/2016 | Furukawa ............. C08F 265/06 523/201 |

FOREIGN PATENT DOCUMENTS

| | | |
|---|---|---|
| EP | 1841810 B1 | 5/2012 |
| WO | 2015020692 | 2/2015 |
| WO | 2016158342 | 10/2016 |

\* cited by examiner

BIMODAL SILICONE-ACRYLIC POLYMER PARTICLES

Polymer particles with a core and a shell are useful for a variety of purposes. For example, when such particles have a core with a relatively low glass transition temperature (Tg) and a shell of relatively high Tg, the particles find utility for a variety of purposes, for example as impact modifiers. Impact modifiers are used as additives to a matrix polymer, and the presence of the impact modifier is intended to improve the impact resistance of the matrix polymer such as styrene/acrylonitrile (SAN). When the modified matrix polymer is intended to be used outdoors, it is desired that the impact modifier resists degradation from weathering. When the modified matrix polymer is intended to be used at relatively high temperatures, it is desired that the impact modifier resists degradation from the high temperatures. It is thought that degradation leads to the development of undesirable color. Some impact modifiers contain silicone polymers and acrylic polymers, both of which are capable of forming low-Tg polymers, and both of which are generally considered to resist weathering and high temperatures. Some silicone polymers have extremely low Tg, which is considered advantageous for some impact modifiers. Silicone polymers are also considered to resist degradation at high temperature and to provide flame retardancy. However, silicone polymers are expensive.

US 2007/0167567 describes a polyorganosiloxane-containing graft copolymer, which is made by a process in which the first step is performing a first polymerization reaction on a modified siloxane that has a terminal group. This first polymerization reaction is performed under acidic conditions and produces a polymeric polyorganosiloxane having pendant vinyl groups. Then vinyl monomers undergo radical polymerization in the presence of this polyorganosiloxane.

It is desired to provide a composition that has the performance advantages of including silicone in the composition but that achieves those advantages while having a reduced amount of silicone in the composition. It also desired to provide a method of making such a composition. It is also desired to provide a composition that contains a matrix polymer such as SAN and that also contains polymer particles of such a composition. It is desired that the polymer composition that contains SAN and the polymer particles has good impact resistance and low color.

The following is a statement of the invention.

A first aspect of the present invention is a collection of polymer particles comprising (I) a plurality of acrylic particles (I) each comprising
  (a) an acrylic core polymer (Ia) comprising
    (i) polymerized units of one or more monovinyl acrylic monomers (jai),
    (ii) polymerized units of one or more Si-free graftlinkers (Iaii),
  (b) a shell polymer (Ib) comprising polymerized units of one or more acrylic monomers (Ib),
(II) a plurality of hybrid polymer particles (II), each comprising
  (a) a core polymer (IIa) comprising
    (i) polymerized units of one or more monomers (IIai) selected from monomers of structure (Y), monomers of structure (Z), and mixtures thereof,

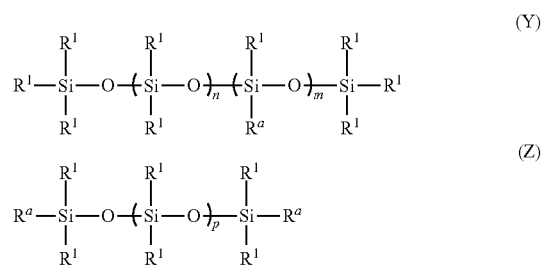

wherein every $R^1$ is independently hydrogen or a hydrocarbon group; n is 0 to 1,000; m is 2 to 1,000; p is 0 to 1,000; every $R^a$ is independently an organic group that contains one or more ethylenically unsaturated group;
    (ii) optionally, polymerized units of one or more monovinyl acrylic monomers (IIaii); and
    (iii) polymerized units of one or more Si-free graftlinkers (IIaiii);
  (b) a shell polymer (IIb) comprising polymerized units of one or more acrylic monomers (IIb).

A second aspect of the present invention is a polymer composition comprising styrene/acrylonitrile and the plurality of polymer particles of the first aspect, wherein the polymer particles of claim 1 are present in an amount of 10% to 50% by weight based on the weight of the polymer composition.

A third aspect of the present invention is a method of making a collection of polymer particles comprising (A) providing a dispersion (D1) of particles of core polymer (IIa) in an aqueous medium, wherein core polymer (IIa) comprises
  (i) polymerized units of one or more silicone monomers (IIai) selected from monomers of structure (Y), monomers of structure (Z), and mixtures thereof,

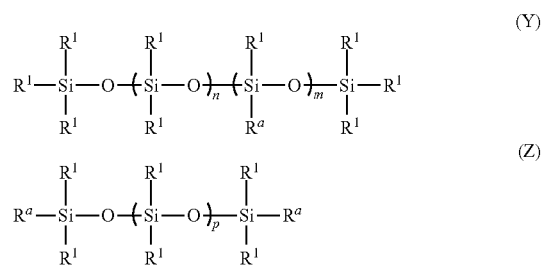

wherein every $R^1$ is independently hydrogen or a hydrocarbon group; n is 0 to 1,000; m is 2 to 1,000; p is 0 to 1,000; every $R^a$ is independently an organic group that contains one or more ethylenically unsaturated group;
  (ii) optionally, polymerized units of one or more monovinyl acrylic monomers (IIaii); and
  (iii) polymerized units of one or more Si-free graftlinkers (IIaiii);
wherein the dispersion (D1) comprises micelles of one or more surfactant,
(B) producing a latex (L1) by performing an emulsion polymerization process (B) by a process comprising adding a monomer emulsion (E2) to dispersion (D1), wherein emulsion (E2) comprises (i) one or more monovinyl acrylic monomers (Iai); and
(ii) one or more Si-free graftlinkers (Iaii);
wherein the polymerization process (B) produces particles of core polymer (Ia) dispersed in the aqueous medium,
wherein latex (L1) comprises dispersed particles of core polymer (Ia) and dispersed particles of core polymer (IIa) in the aqueous medium,
(C) producing a latex (L2) by performing an emulsion polymerization process (C) by a process comprising adding a monomer emulsion (E3) to latex (L1), wherein emulsion (E3) comprises one or more acrylic monomers (Ib).

The following is a brief description of the drawings.

Figure 1:
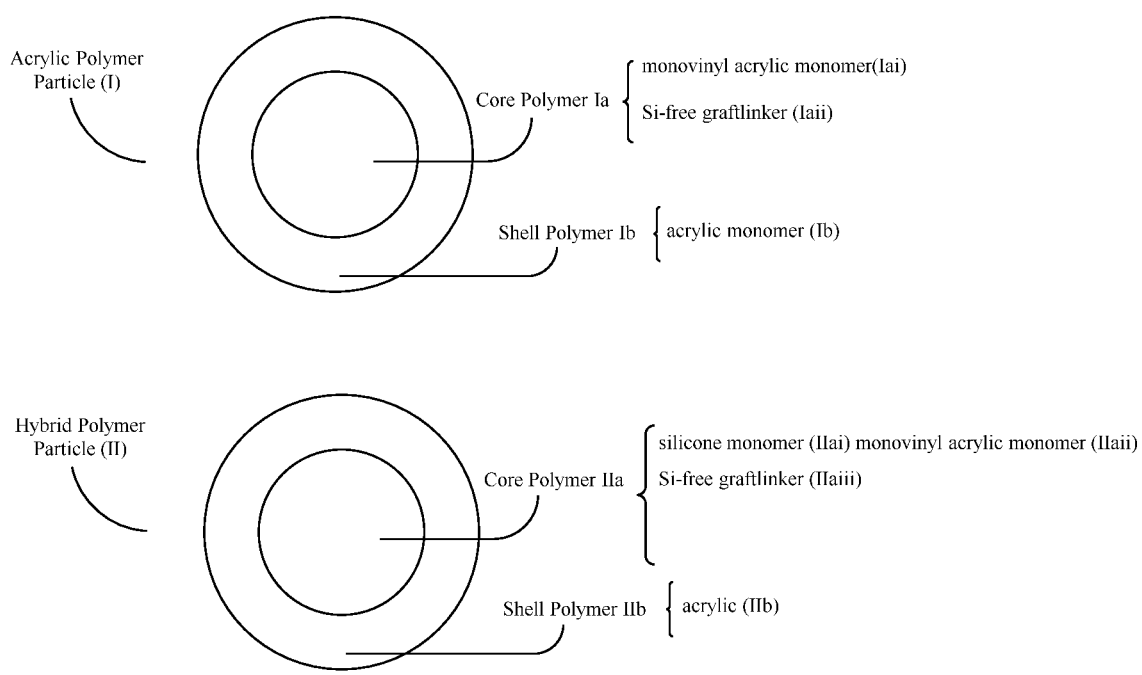
FIG. 1 is a schematic drawing of an acrylic polymer particle (I) and a hybrid polymer particle (II), not to scale, showing the nomenclature for the cores and the shells.
Figure 2:
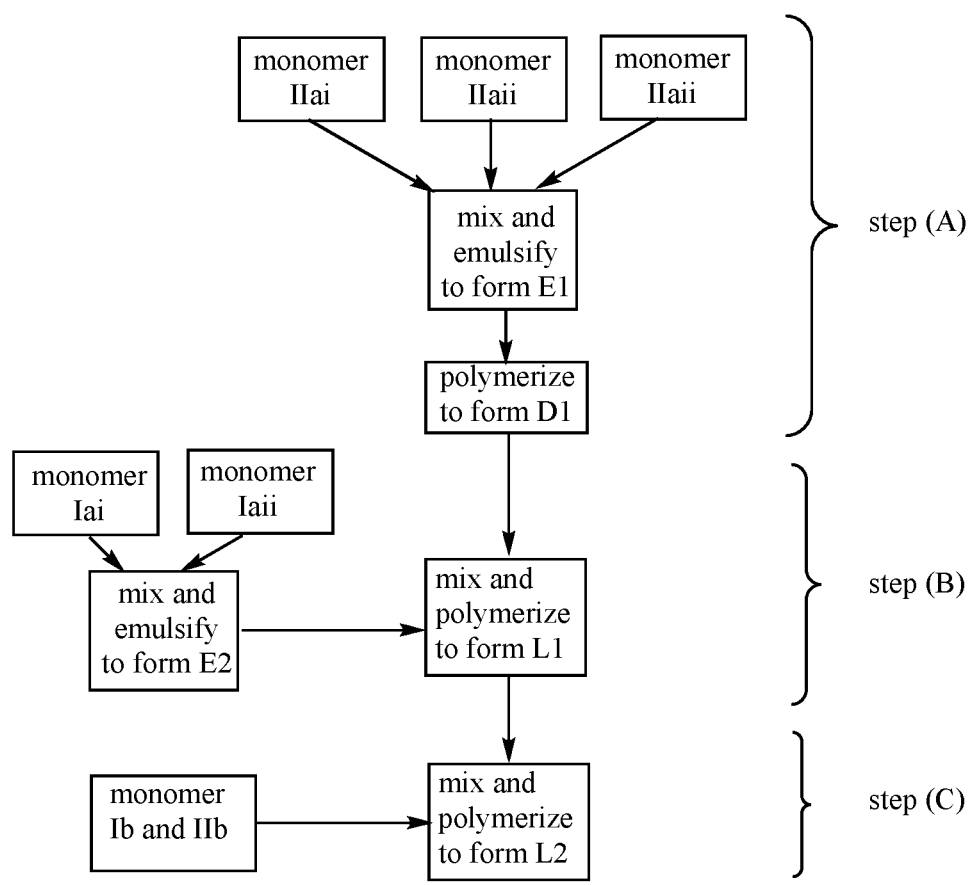
FIG. 2 is a flow chart showing the steps for one embodiment of a method for making the polymer particles of the present invention.

The following is a detailed description of the invention.

As used herein, the following terms have the designated definitions, unless the context clearly indicates otherwise As used herein, a "polymer" is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Molecules that can react with each other to form the repeat units of a polymer are known herein as "monomers." The repeat units so formed are known herein as "polymerized units" of the monomer. A molecule having fewer than 100 repeat units of monomer is an oligomer, and a molecule having 100 or more repeat units of monomer is a polymer.

Vinyl monomers have the structure (III)

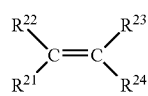

(III)

where each of $R^{21}$, $R^{22}$, $R^{23}$, and $R^{24}$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers are capable of free radical polymerization to form polymers. Aliphatic groups, including alkyl groups, may be linear, branched, cyclic, or a combination thereof.

Some vinyl monomers have one or more polymerizable carbon-carbon double bonds incorporated into one or more of $R^{21}$, $R^{22}$, $R^{23}$, and $R^{24}$ such vinyl monomers are known herein as multifunctional vinyl monomers. Vinyl monomers with exactly one polymerizable carbon-carbon double bond are known herein as monofunctional vinyl monomers.

Acrylic monomers are vinyl monomers in which each of $R^1$ and $R^2$ is hydrogen; $R^3$ is either hydrogen or methyl; and $R^4$ has one of the following structures (V), (VI), or (VII):

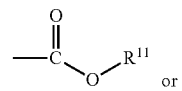

(V)

or

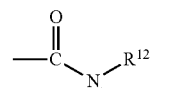

(VI)

or

(VII)

where each of $R^{11}$, $R^{12}$, and $R^{14}$ is, independently, hydrogen, a $C_1$ to $C_{14}$ alkyl group, or a substituted $C_1$ to $C_{14}$ alkyl group. As defined herein, an acrylic monomer contains no silicon atom.

A polymer having 90% or more by weight polymerized units of vinyl monomers is a vinyl polymer. A polymer having 55% or more by weight of polymerized units of acrylic monomers are acrylic polymers. A polymer is considered herein to be crosslinked if the polymer contains 0.5% or more by weight polymerized units of multifunctional vinyl monomers. A crosslinked polymer is considered herein to be "fully" crosslinked if in a typical sample of the crosslinked polymer, 20% or less by weight of the polymer is material that is soluble in any solvent.

The category of multifunctional vinyl monomers contains two subcategories: crosslinkers and graftlinkers. In a crosslinker, every polymerizable vinyl group on the molecule is substantially the same as every other polymerizable vinyl group on the molecule. In a graftlinker (iii), at least one polymerizable vinyl group on the molecule is substantially different from at least one other polymerizable vinyl group on the molecule. "Substantially" is defined by the molecular structure as follows. Each polymerizable vinyl group is defined by two carbon atoms and the groups $R^1$, $R^2$, $R^3$, and $R^4$ as shown above in structure (I). The "environment" of each carbon atom is defined herein as the configuration of atoms that is determined by following any path of three covalent bonds from one of the carbon atoms in structure (I).

For example, the following molecules are crosslinkers because in each molecule, every polymerizable vinyl group is identical in its chemical environment to every other polymerizable vinyl group in the same molecule: divinyl benzene, ethylene glycol diacrylate, and trimethylolpropane triacrylate. For another example, it useful to consider 1,3 butanediol diacrylate (1, 3-BDA):

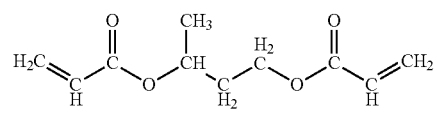

(VIII)

1,3-BDA is a crosslinker, because both of the polymerizable vinyl groups have the same "environment." as defined above. The "environment" of the vinyl group is shown in the following structure (IX):

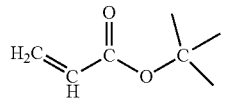

(IX)

Examples of graftlinkers are allyl methacrylate, allyl acrylate, allyl acryloxypropionate, and diallyl maleate.

Another type of polymer or oligomer are polysiloxane polymers and oligomers. Polysiloxane oligomers and polymers have the structure (X):

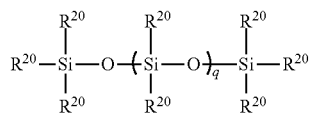

(X)

where each $R^{20}$ is, independently of every other $R^{20}$, hydrogen, a hydrocarbon group, or a substituted hydrocarbon group; and were q is 1 or larger. Some polysiloxane oligomers or polymers have one or more $R^{20}$ group that contains a vinyl group that is capable of undergoing vinyl polymerization; such a polysiloxane oligomer or polymer also fits the category of "vinyl monomer."

One type of vinyl monomer has the structure (X) in which q=0 and in which one or more of the $R^{20}$ groups contains a vinyl group that is capable of undergoing vinyl polymerization.

The measured glass transition temperature (Tg) of a polymer is determined by differential scanning calorimetry (DSC) at 10° C./minute. From the DSC data, a glass transition is detected, and then the temperature of that transition is determined by the midpoint method. The Tg of a monomer is defined as the measured Tg of a homopolymer made from that monomer. It is also useful to define the calculated Tg of a polymer, which is is determined by the Fox equation:

$$\frac{1}{Tg\, polymer} = \sum_{i=1}^{z} \frac{w_i}{Tgi}$$

where Tg polymer is the calculated Tg of the polymer (in Kelvin), where there are z monomers, labeled with index i, running from 1 to z; where $w_i$ is the weight fraction of the ith monomer, and where Tgi is the measured Tg (in Kelvin) of a homopolymer of the ith monomer.

A polymer that contains polymerized units of styrene and polymerized units of acrylonitrile is known herein as "SAN." SAN contains 60% to 90% by weight polymerized units of styrene and 10% to 40% by weight polymerized units of acrylonitrile. In SAN polymers, the sum of the weight percentages of styrene and acrylonitrile is 70% or more. Polymerized units of other monomers, such as, for example, alkyl(meth)acrylates monomers, may be present.

A collection of particles is characterized by the diameters. If a specific particle is not spherical, the diameter of that specific particle is taken herein to be the diameter of an imaginary particle that has the same volume as the specific particle. A collection of particles is characterized by the volume-average diameter, which is measured by dynamic light scattering on a dispersion of the particles in a liquid medium.

Polymer particles are said herein to be dispersed in a matrix polymer if the matrix polymer forms a continuous phase and the polymer particles are distributed throughout matrix polymer. The dispersed polymer particles may be distributed randomly or in some non-random pattern.

A compound is considered herein to be water soluble if 2 or more grams of that compound will dissolve in 100 grams of water at 25° C. A compound is considered herein to be water insoluble if the maximum amount of that compound that will dissolve in water at 25° C. is 0.5 gram or less.

A surfactant is an organic compound that has one or more groups that are hydrophilic and one or more groups that are hydrophobic. A group is hydrophobic if, when the group is isolated and the one or more bonds between the group and the remainder of the surfactant molecule are broken and then capped with a hydrogen atom, the resulting molecule is water insoluble. A group is hydrophilic if, when the group is isolated and the one or more bonds between the group and the remainder of the surfactant molecule are broken and then capped with a hydrogen atom, the resulting molecule is water soluble. A micelle is a structure suspended in water, in which the interior of the structure is made almost entirely of hydrophobic groups attached to surfactant molecules, and the surface of the structure is made almost entirely of hydrophilic groups attached to surfactant molecules. A micelle contains 5% or less, by weight based on the weight of the micelle, of any organic compound that is not a surfactant.

A surfactant is an anionic surfactant if, at any pH value between 4 and 10, when the surfactant is present in water, 50 mole % or more of the hydrophilic groups are in an anionic state. A surfactant is a cationic surfactant if, at any pH value between 4 and 10, when the surfactant is present in water, 50 mole % or more of the hydrophilic groups are in a cationic state.

A compound that has no silicon atom is known herein as a "Si-free" compound.

Ratios are described herein as follows. For example, if a ratio is said to be 3:1 or greater, that ratio may be 3:1 or 5:1 or 100:1 but may not be 2:1. The general statement of this idea is as follows: when a ratio is said herein to be X:1 or greater, it is meant that the ratio is Y:1, where Y is greater than or equal to X. Similarly, for example, if a ratio is said to be 15:1 or less, that ratio may be 15:1 or 10:1 or 0.1:1 but may not be 20:1. Stated in a general way: when a ratio is said herein to be W:1 or less, it is meant that the ratio is Z:1, where Z is less than or equal to W.

The present invention involves a collection of polymer particles. Each polymer particle contains a core polymer and a shell polymer. The collection of polymer particles of the present invention contains two types of particles: acrylic polymer particles (I) and hybrid polymer particles (II).

The acrylic polymer particles (I) each comprise an acrylic core polymer (Ia) and a shell polymer (Ib).

The core polymer (Ia) contains polymerized units of one or more monovinyl acrylic monomer (Iai). Preferred monovinyl acrylic monomers (Iai) are acrylic acid, methacrylic acid, unsubstituted-alkyl esters thereof, substituted-alkyl esters thereof, and mixtures thereof. More preferred are acrylic acid, methacrylic acid, unsubstituted-alkyl esters thereof, and mixtures thereof. More preferred are one or more unsubstituted alkyl esters of acrylic acid or methacrylic acid. More preferred are one or more unsubstituted alkyl esters of acrylic acid. Among unsubstituted alkyl esters of acrylic acid and methacrylic acid, preferred are those with alkyl group having 18 or fewer carbon atoms; more preferred is 8 or fewer carbon atoms; more preferred is 6 or fewer carbon atoms; more preferred is 4 or fewer carbon atoms. Among unsubstituted alkyl esters of acrylic acid and methacrylic acid, preferred are those with alkyl group having 2 or more carbon atoms; more preferred is 4 or more carbon atoms.

The core polymer (Ia) also contains polymerized units of one or more Si-free graftlinkers (Iaiii). Preferred Si-free graftlinkers (Iaiii) are allyl methacrylate, allyl acrylate, allyl acryloxypropionate, diallyl maleate, and mixtures thereof; more preferred is allyl methacrylate.

Preferably, in the core polymer (Ia), the weight ratio of polymerized units of monovinyl acrylic monomer (Iai) to polymerized units of Si-free graftlinker (Iaiii) is 32:1 or greater; more preferably 49:1 or greater; more preferably 99:1 or greater. Preferably, in the core polymer (Ia), the weight ratio of polymerized units of monovinyl acrylic monomer (Jai) to polymerized units of Si-free graftlinker (Iaiii) is 999:1 or lower; more preferably 332:1 or lower; more preferably 199:1 or lower.

Preferably, the sum of the weights of polymerized units of monovinyl acrylic monomer (Jai) and polymerized units of Si-free graftlinker (Iaiii) is, by weight based on the weight of core polymer (Ia), 90% or more; more preferably 95% or more; more preferably 99% or more.

Preferably the amount of core polymer (Ia), by weight based on the sum of the weight of acrylic polymer particles (I) plus the weight of hybrid polymer particles (II), is 5% or more; more preferably 8% or more. Preferably the amount of core polymer (Ia), by weight based on the sum of the weight of acrylic polymer particles (I) plus the weight of hybrid polymer particles (II), is 50% or less; more preferably 40% or less; more preferably 30% or less.

Preferably, the calculated Tg of core polymer (Ia) is −80° C. or higher; more preferably −70° C. or higher; more preferably −60° C. or higher. Preferably, the calculated Tg of core polymer (Ia) is 0° C. or lower; more preferably −20° C. or lower; more preferably −40° C. or lower.

The acrylic polymer particle (I) of the present invention also contains a shell polymer (Ib), which contains polymerized units of one or more acrylic monomer (Ib). The shell polymer (Ib) is preferably polymerized in the presence of the core polymer (Ia). More preferably, the shell polymer (Ib) and the shell polymer (IIb) are polymerized simultaneously, in the presence of both core polymer (Ia) and core polymer (IIa).

Preferably, the shell polymer (Ib) contains polymerized units of one or more acrylic monomer (Ib). Preferred acrylic monomers (Ib) are acrylic acid, methacrylic acid, unsubstituted-alkyl esters thereof, substituted-alkyl esters thereof, and mixtures thereof. More preferred are acrylic acid, methacrylic acid, unsubstituted-alkyl esters thereof, and mixtures thereof. More preferred are one or more unsubstituted alkyl esters of acrylic acid or methacrylic acid. More preferred are one or more unsubstituted alkyl esters of methacrylic acid. In the shell polymer (Ib), among unsubstituted alkyl esters of acrylic acid and methacrylic acid, preferred are those in which the alkyl group has 4 or fewer carbon atoms; more preferably 3 or fewer carbon atoms; more preferably 2 or fewer carbon atoms, more preferably one carbon atom, and mixtures thereof.

The hybrid polymer particles (II) each comprise a core polymer (IIa) and a shell polymer (IIb).

Preferably, the core polymer (IIa) resides at the center of the polymer particle (II). In some embodiments, the shell polymer (IIb) is disposed on the surface of the core polymer (IIa); in some embodiments, the shell polymer (IIb) surrounds the core polymer (IIa).

The core polymer (IIa) contains polymerized units of one or more silicone monomers (IIai). Silicone monomer (IIai) is defined herein as monomer selected from monomers of structure (Y), monomers of structure (Z), and mixtures thereof,

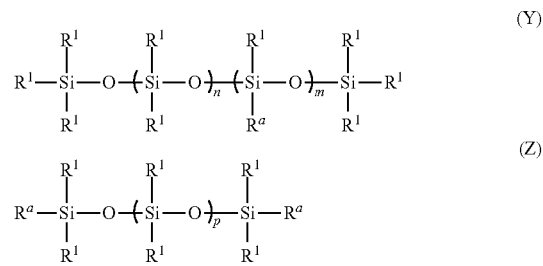

where every $R^1$ is independently hydrogen or a hydrocarbon group; n is 0 to 1,000; m is 2 to 1,000; p is 0 to 1,000; every $R^a$ is independently an organic group that contains one or more ethylenically unsaturated group. In structure (Y), the groups in the two sets of parentheses may be arranged in any manner; they may be in two blocks as shown, or in multiple blocks, or alternating, or in statistical order, or in a combination thereof. Preferred is statistical order. That is, it is preferred that the "m" units and "n" units are arranged as in a statistical copolymer.

In structures (Y) and (Z), preferred $R^1$ groups are hydrogen and hydrocarbon groups having 12 or fewer carbon atoms; more preferably hydrogen and hydrocarbon groups having 8 or fewer carbon atoms; more preferably hydrocarbon groups having 4 or fewer carbon atoms; more preferably methyl groups. In structures (I) and (II), preferably all $R^1$ groups are the same as each other.

In structures (Y) and (Z), preferred $-R^a$ groups have the structure

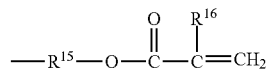

where $R^{15}$ is a hydrocarbon group, preferably an alkyl group. Preferably $R^{15}$ has 8 or fewer carbon atoms; more preferably 5 or fewer; more preferably 3 or fewer. Preferably $R^{15}$ has 1 or more carbon atoms; more preferably 2 or more carbon atoms; more preferably 3 or more carbon atoms. $R^{16}$ is either hydrogen or methyl; preferably methyl. Preferably all $R^a$ groups are the same as each other.

In structure (Y), n is preferably 10 or more; more preferably 20 or more; more preferably 50 or more; more preferably 100 or more. In structure (Y), n is preferably 800 or less; more preferably 500 or less; more preferably 300 or less. In structure (Y), the ratio of n:m is preferably 5:1 or higher; more preferably 10:1 or higher; more preferably 15:1 or higher. In structure (Y), the ratio of n:m is preferably 100:1 or lower; more preferably 50:1 or lower; more preferably 30:1 or lower. In structure (Z), p is preferably 10 or more; more preferably 20 or more; more preferably 50 or more. In structure (Z), p is preferably 800 or less; more preferably 500 or less; more preferably 300 or less.

Monomers of structure (Z) are preferred.

The core polymer (IIa) optionally also contains polymerized units of one or more monovinyl acrylic monomer (IIaii). Preferred monovinyl acrylic monomers (IIaii) are acrylic acid, methacrylic acid, unsubstituted-alkyl esters thereof, substituted-alkyl esters thereof, and mixtures thereof. More preferred are acrylic acid, methacrylic acid, unsubstituted-alkyl esters thereof, and mixtures thereof. More preferred are one or more unsubstituted alkyl esters of acrylic acid or methacrylic acid. More preferred are one or more unsubstituted alkyl esters of acrylic acid. Among unsubstituted alkyl esters of acrylic acid and methacrylic acid, preferred are those with alkyl group having 18 or fewer carbon atoms; more preferred is 8 or fewer carbon atoms; more preferred is 6 or fewer carbon atoms; more preferred is 4 or fewer carbon atoms. Among unsubstituted alkyl esters of acrylic acid and methacrylic acid, preferred are those with alkyl group having 2 or more carbon atoms; more preferred is 4 or more carbon atoms.

The core polymer (IIa) also contains polymerized units of one or more graftlinkers (IIaiii). Preferred graftlinkers (IIaiii) are allyl methacrylate, allyl acrylate, allyl acryloxypropionate, diallyl maleate, and mixtures thereof; more preferred is allyl methacrylate.

Preferably the amount of polymerized units of monomer (IIai), by weight based on the weight of core polymer (IIa), is 40% or more; more preferably 50% or more. Preferably the amount of polymerized units of monomer (IIai), by weight based on the weight of core polymer (IIa), is 99% or less; more preferably 98% or less.

In the core polymer (IIa), amount of all monovinyl acrylic monomers (IIaii), by weight based on the weight of core polymer (IIa), is 0% or more. In the core polymer (IIa), amount of all monovinyl acrylic monomers (IIaii), by weight based on the weight of core polymer (IIa), is preferably 70% or less; more preferably 60% or less; more preferably 50% or less.

In the core polymer (IIa), the amount of Si-free graftlinker (IIaiii) is, by weight based on the weight of core polymer (IIa), preferably 0.2% or more; more preferably 0.3% or more; more preferably 0.4% or more. In the core polymer (IIa), the amount of Si-free graftlinker (IIaiii) is, by weight based on the weight of core polymer (IIa), preferably 4% or less; more preferably 3% or less.

Preferably the sum of the amounts of polymerized units of monomer (IIai) plus the polymerized units of monovinyl acrylic monomer (IIaii), plus the polymerized units of the graftlinker (IIaiii), by weight based on the weight of core polymer, is 95% or more; more preferably 98% or more; more preferably 99% or more.

Preferably, the calculated Tg of core polymer (IIa) is −150° C. or higher; more preferably −140° C. or higher. Preferably, the calculated Tg of core polymer (IIa) is lower than −80° C.; more preferably −95° C. or lower; more preferably −110° C. or lower.

While the invention is not limited to any specific theory, it is contemplated that, in the core polymer (IIa) of the hybrid polymer particle (II) the monomer (IIai), because it has plural polymerizable vinyl groups, acts as a crosslinker, resulting in the relatively low soluble fraction of the core polymer.

The hybrid polymer particle (II) also contains a shell polymer (IIb), which contains polymerized units of one or more acrylic monomer (IIb).

Preferably, the shell polymer (IIb) contains polymerized units of one or more acrylic monomer (IIb). Preferred acrylic monomers (IIb) are acrylic acid, methacrylic acid, unsubstituted-alkyl esters thereof, substituted-alkyl esters thereof, and mixtures thereof. More preferred are acrylic acid, methacrylic acid, unsubstituted-alkyl esters thereof, and mixtures thereof. More preferred are one or more unsubstituted alkyl esters of acrylic acid or methacrylic acid. More preferred are one or more unsubstituted alkyl esters of methacrylic acid. In the shell polymer (IIb), among unsubstituted alkyl esters of acrylic acid and methacrylic acid, preferred are those in which the alkyl group has 4 or fewer carbon atoms; more preferably 3 or fewer carbon atoms; more preferably 2 or fewer carbon atoms, more preferably one carbon atom, and mixtures thereof.

Preferably the amount of core polymer (IIa), by weight based on the sum of the weight of acrylic polymer particles (I) plus the weight of hybrid polymer particles (II), is 30% or more; more preferably 40% or more; more preferably 50% or more; more preferably 60% or more. Preferably the amount of core polymer (IIa), by weight based on the sum of the weight of acrylic polymer particles (I) plus the weight of hybrid polymer particles (II), is 90% or less; more preferably 80% or less.

It is useful to consider some features that are common to both the acrylic polymer particle (I) and the hybrid polymer particle (II).

In each of the acrylic polymer particle (I) and the hybrid polymer particle (II), it is useful to characterize the monomer or mixture of monomers that are used in making the shell polymer by finding the calculated Tg, as defined herein above. The calculation of the calculated Tg uses the monomers that are added to form the shell polymer and ignores the possibility that those monomers might copolymerize with the unreacted polymerizable vinyl groups attached to the core polymer. For each of the shell polymers (Ib) and (IIb) independently, preferably, the calculated Tg of the shell polymer is 50° C. or higher; more preferably 75° C. or higher; more preferably 85° C. or higher. For each of the shell polymers (Ib) and (IIb) independently, preferably, the calculated Tg of the shell polymer is 150° C. or lower.

The shell polymer (Ib) is preferably polymerized in the presence of the core polymer (Ia). The shell polymer (IIb) is preferably polymerized in the presence of the core polymer (IIa). More preferably, the two shell polymers (Ib) and (IIb) are made simultaneously from the same monomer or mixture of monomers by polymerizing that monomer or mixture of monomers in the presence of a mixture of core polymer (Ia) and core polymer (IIa). When the two shell polymers are made simultaneously in this manner, it is considered that the two shell polymers (Ib) and (IIb) have the same composition.

It is useful to characterize the amount of shell polymer by the amount of the sum of shell polymer (Ib) plus the amount of shell polymer (IIb), as a percentage of the total of the sum of the weight of acrylic polymer particles (I) plus the weight of hybrid polymer particles (II). The amount of shell polymer is preferably 4% or more; more preferably 8% or more; more preferably 12% or more. The amount of shell polymer is preferably 40% or less; more preferably 30% or less; more preferably 20% or less.

In considering the shell polymers (Ib) and (IIb), it is useful to also consider the fate of the graftlinkers that were used in making the core polymers (Ia) and (IIa). Preferably, when the core polymer was polymerized, some or all of the graftlinkers went through the polymerization process of making the core polymer by reacting one or more polymerizable vinyl group but leaving one or more additional polymerizable vinyl group unreacted. That is, preferably, the core polymer has unreacted polymerizable vinyl groups attached to it. Preferably, when monomers used in making the shell polymer are polymerized in the presence of the core polymer, some of those monomers will copolymerize with those unreacted polymerizable vinyl groups attached to the core polymer, and some of those monomers will polymerize with each other. It is contemplated that such an outcome is possible because some polymerizable groups on the graftlinker are more highly reactive than other groups, and the polymerization conditions of the formation of the core polymer are chosen so that the monomers will copolymerize with each other and with only the more-reactive polymerizable vinyl groups on the graftlinker. Preferably, aside from those unreacted polymerizable vinyl groups, each of shell polymer (Ib) and shell polymer (IIb) independently contains no polymerized units of multivinyl monomer.

The composition of the present invention may be made by any method. A preferred method of making the composition is summarized as follows. In step (A), an aqueous miniemulsion polymerization is performed to form a dispersion (D1) of core polymer (IIa) (in this preferred process, core polymer (IIa) is formed before core polymer (Ia)). Next, in step (B), an emulsion polymerization process is performed that includes adding a monomer emulsion (E2) to dispersion (D1) under polymerization conditions, to form a latex (L1). The monomer emulsion (E2) contains the monomers that polymerize to form core polymer (Ia). The latex (L1) contains both dispersed particles of core polymer (Ia) and dispersed particles of core polymer (IIa). Then, in step (C), another emulsion polymerization process is performed, to form a latex (L2). The emulsion polymerization process (C) includes adding a monomer emulsion (E3) to latex (L1) under polymerization conditions. The monomer emulsion (E3) contains the monomers that polymerize to form the shell polymer. Preferably, in the polymerization process (C), shell polymers form around particles of core polymer (Ia) and also around particles of core polymer (IIa), thus forming shell polymers (Ib) and (IIb).

Preferably, in step (A), a mixture (M1) is made of one or more monomer (IIai), one or more monovinyl acrylic monomer (IIaii), and one or more graftlinker (IIaiii). The suitable and preferred types and amounts of monomer (IIai), monovinyl acrylic monomer (IIaii), and graftlinker (IIaiii) are the same as those described herein above for the core polymer.

Preferably, mixture (M1) is then brought into contact with water and surfactant to form mixture (M2). The surfactant may be cationic, nonionic, or anionic; preferred are nonionic and anionic; more preferred are anionic surfactants.

The amount of surfactant is characterized as the weight of surfactant, as a percentage of the total weight of polymer, including acrylic polymer particles (I) and hybrid polymer particles (II). That is, when it is stated that, in mixture M2, the amount of surfactant is 2%, that statement means that, in mixture M2, the weight of surfactant present in mixture M2 is WS1, and after the entire process of steps (A), (B), and (C) is finished, and the total weight of acrylic polymer particles (I) and hybrid polymer particles (II) is WP2, then $$2=100*WS1/WP2.$$

Preferably mixture (M1) has viscosity at 25° C. of 10 mPa*s or less, as measured in a cone and plate rheometer under steady shear at 100 sec$^{-1}$.

Preferably the amount of water in mixture (M2) is, by weight based on the weight of mixture (M2), 55% or more; more preferably 65% or more. Preferably the amount of water in mixture (M2) is, by weight based on the weight of mixture (M2), 95% or less; more preferably 85% or less.

Preferably, the mixture (M2) is mechanically agitated to form an emulsion (E1), in which droplets of mixture (M1) are dispersed in water. Suitable methods of agitation employ, for example, high shear mixing, ultrasound or microfluidization, and combinations thereof. Preferably the volume-average droplet size in emulsion (E1) is 500 nm or less.

The amount of surfactant in E1 is sufficient to form surfactant micelles. That is, it is contemplated that some of the surfactant will be located at the surfaces of the droplets and thus will stabilize the dispersion of the droplets. In the practice of the present invention, sufficient surfactant is present in emulsion (E1) to both stabilize the dispersion of the droplets and to also form surfactant micelles in the aqueous medium.

The amount of surfactant needed depends on the size of the droplets. For a given weight of droplets, a dispersion of droplets with smaller diameter will have higher total surface area and therefore will require more surfactant to both stabilize the droplets and form micelles. Preferably, the minimum amount of surfactant is as follows:

$$\text{(minimum amount surfactant,\%)}=282/(\text{volume-average radius of droplets (nm)})$$

Preferably, the amount of surfactant in emulsion (E1) is greater than or equal to the minimum amount of surfactant.

Preferably, also present in the emulsion (E1) is one or more initiators. Preferred initiators are water insoluble thermal initiators, water soluble redox initiators, and mixtures thereof. Redox initiators react with reductants, sometimes in the presence of a catalyst, to produce radicals that initiate vinyl polymerization. Preferred water soluble redox initiators are persulfates (including, for example, sodium persulfate, potassium persulfate, and ammonium persulfate) and hydroperoxides (including, for example, t-butyl hydroperoxide, hydrogen peroxide, and 1-methyl-1-(4-methylcyclohexyl/ethyl hydroperoxide). Preferred reductants are sodium bisulfite, ascorbic acid, tetramethyl ethylene diamine, and sodium metabisulfite. Preferred catalysts are ethylenediamine tetraacetic acid (EDTA) and ferrous sulfate.

Thermal initiators are stable at room temperature but decompose at elevated temperature to produce radicals that initiate vinyl polymerization. Preferred thermal initiators are peroxides and azo compounds.

Preferably, emulsion (E1) contains one or more water soluble redox initiator.

Preferably, emulsion (E1) is heated to 40° C. or higher, and polymerization is allowed to take place. Preferably polymerization takes place within the droplets of mixture (M1), and the polymer is formed as particles of solid polymer dispersed in water. This type of polymerization is known as "mini-emulsion" polymerization. The result is a dispersion (D1) of particles of core polymer (IIa) in water.

Preferably, step (B) is then performed. In step (B), a mixture (M2) of monomers is made and then mixed with one or more anionic surfactant and with water to form an emulsion (E2). The monomers in mixture (M2) are those described above as appropriate for inclusion in core polymer (Ia); i.e., one or more monovinyl acrylic monomers (Iai) and one or more Si-free graftlinkers (Iaii)). Preferably, emulsion (E2) is combined with dispersion (D1) and one or more water-soluble initiator, and the resulting mixture (M3) is heated to a temperature of 40° C. to 70° C. Emulsion (E2) may be combined with dispersion (D1) in a variety of ways. For example, emulsion (E2) may be added to dispersion (D1) in a single, relatively sudden operation (called a "shot"); or emulsion (E2) may be separated into more than one portion, and each portion may be added as separate shot; or emulsion (E2) may be added gradually. Preferably, emulsion (E2) is added to dispersion (D1) in plural shots. Preferably, the process of step (B) is a process of emulsion polymerization, in which monomer diffuses through the aqueous medium to growing polymer particles, which began growing in surfactant micelles. Preferably, the product of step (B) is a latex (L1), which contains dispersed particles of core polymer (Ia) and dispersed particles of core polymer (IIa).

Preferably, step (C) is then performed. In step (C), a mixture (M4) of monomers is made and then mixed with one or more anionic surfactant and with water to form an emulsion (E3). The monomers in mixture (M4) are those described above as appropriate for inclusion in shell polymer (Ib) or shell polymer (IIb); i.e., one or more acrylic monomers (Ib) or (IIb). Preferably, emulsion (E3) is combined with latex (L1), and the resulting mixture (M5) is heated to a temperature of 70° C. or higher. Emulsion (E3) may be combined with dispersion (D1) in a variety of ways. For example, emulsion (E2) may be added to Latex (L1) in a single, relatively sudden operation (called a "shot"); or emulsion (E3) may be separated into more than one portion, and each portion may be added as separate shot; or emulsion (E3) may be added gradually. Preferably, emulsion (E3) is added to latex (L1) gradually. Preferably, the process of step (C) is a process of emulsion polymerization, in which monomer molecules through the aqueous medium from the droplets of emulsion (E3) to growing polymer on the surfaces of the particles of core polymer (Ia) and the surfaces of the particles core polymer (IIa), preferably copolymerizing with the available polymerizable vinyl groups attached to the core polymers. Preferably, the product of step (C) is a latex (L2), which contains dispersed acrylic polymer particles (I) and dispersed hybrid polymer particles (II).

It is noted that in this preferred method, a single monomer or a single mixture of monomers (M4) is used in a single polymerization process that forms both shell polymer (Ib) and shell polymer (IIb). In this embodiment, it is considered herein that shell polymers (Ib) and (IIb) have the same composition. It is also recognized that the two shell polymer may have one or more differences. For example, the monomer or monomers (M4) may partition between the two different core polymers in a variety of proportions. Also, degree of grafting to the two different core polymers may be different.

Latex (L2) contains two different types of particles: acrylic polymer particles (I) and hybrid polymer particles (II). It is contemplated that each type of particle will have its own distribution of particle diameters. Nevertheless, it is useful to characterize the volume-average diameter of the entire latex (L2), by dynamic light scattering. In latex (L2), preferably the volume-average diameter of the particles is 100 nm or larger; more preferably 200 nm or more. Preferably the volume-average diameter of the particles is 1,000 nm or less; more preferably 750 nm or less; more preferably 500 nm or less. Preferably, the amount of polymer in latex (L2) is, by weight based on the total weight of latex (L2), 20% or more; more preferably 30% or more. Preferably, the amount of polymer in latex (L2) is, by weight based on the total weight of latex (L2), 50% or lower; more preferably 45% or lower.

Latex (L2) may optionally be dried to remove water. Suitable methods of drying include freeze drying, spray drying, and coagulation followed by belt drying and fluid-bed drying. The resulting composition dried composition preferably has an amount of water, by weight based on the weight of dried composition, of 10% or less; more preferably 5% or less.

Polymer particles of the present invention may be used for any purpose. One preferred use is to add a plurality of the particles to a matrix polymer. It is contemplated that adding the particles to a matrix polymer will improve the impact resistance of the matrix polymer. Preferred matrix polymers are polyvinyl chloride, polycarbonate, polystyrene, styrene/acrylonitrile copolymers, polymethyl methacrylate, and mixtures thereof. Preferred are styrene/acrylonitrile copolymers.

A composition comprising matrix polymer and polymer particles of the present invention is known herein as a matrix polymer formulation. A matrix polymer formulation optionally contains additional ingredients, such as, for example, pigments, colorants, stabilizers, lubricants, and combinations thereof. The amount of polymer particles of the present invention in a matrix polymer formulation is preferably, by weight based on the weight of the matrix polymer formulation, 5% or more; more preferably 10% or more; more preferably 20% or more. The amount of polymer particles of the present invention in a matrix polymer formulation is preferably, by weight based on the weight of the matrix polymer formulation, 60% or less; more preferably 50% or less.

Preferably, the polymer particles of the present invention are dispersed in the matrix polymer. The dispersed polymer particles may be distributed randomly or in some nonrandom way, or a combination thereof. An example of nonrandom distribution of dispersed particles is strings that are rich in polymer particles and poor in matrix polymer.

The following are examples of the present invention.

The existence of a separate shell phase may be observed, for example by atomic force microscopy (AFM). A collection of the polymer particles may be heated and pressed into a film, which may be analyzed by AFM. Preferably, a separate shell phase is observed. In some embodiments, a shell phase that is observable by AFM does not exhibit a separate Tg when analyzed by DSC.

A polymer be characterized by the soluble fraction. The soluble fraction is measured by bringing a sample of the polymer into contact with tetrahydrofuran (THF) and mixing thoroughly. Then the polymer that has not dissolved is removed by centrifugation and filtration. The resulting solution of polymer dissolved in THF is then analyzed by nuclear magnetic resonance (NMR) spectroscopy. If more than one type of polymer is present in the original sample, the NMR spectroscopy reveals the relative amounts of each type of polymer dissolved in the THF. The solution of polymer in THF is dried, and the weight of the dry polymer is measured.

When the collection of polymer particles of the present invention is made by the preferred method described above, the soluble fraction analysis may be made at several stages: after (A) polymerization of core polymer (IIa); after (B) polymerization of core polymer (Ia); and after (C) polymerization of the shell polymer. It is also possible to measure the amount of unreacted monomer after each of these stages. From the results of these analyses, it is possible to calculate the soluble amount of each type of polymer made in the process. Of particular interest is the amount of polymerized shell monomer (i.e., monomer Ib and IIb). Some of the polymer chains in the shell polymer will be grafted to one of the core polymers (via copolymerization with graftlinker), and some of the polymer chains will not be grafted to any core polymer. Many of the polymer chains in the shell polymer that graft to a core polymer will be grafted to a portion of the core polymer that is crosslinked and therefore insoluble, and those polymer chains of the shell polymer will also be insoluble. The amount of grafted shell monomer, as a weight percent, is defined as follows:

% GS=100*(WPS−WSS)/WPS where % GS is the weight percent of grafted shell polymer; WPS is the total weight of all polymerized shell polymer; and WSS is the weight of soluble shell polymer.

Preferably, % GS is 35% or more; more preferably 45% or more; more preferably 55% or more. Preferably, % GS is 90% or less.

Similarly, the soluble fraction of the shell polymer is the weight of shell polymer dissolved in the THF, divided by the weight of all the polymerized units of the monomers that were added to the core polymer to make the shell polymer that was in the sample of core/shell polymer, expressed as a percentage.

The following are examples of the present invention
The following abbreviations and materials were used:
TSO-1=telechelic silicone oil, having the following structure, where p=198:

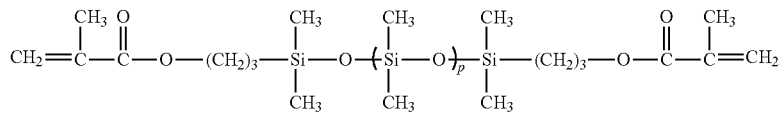

BA=butyl acrylate
ALMA=allyl methacrylate
MMA=methyl methacrylate
DS-4=RHODOCAL DS-4' sodium dodecylbenzene sulfonate (from Rhodia)
NaPS=sodium persulfate
pbw=parts by weight

EXAMPLE 1 (SILICONE-ONLY CORE POLYMER (IIA))

A mixture (M1) was prepared of 98 parts by weight TSO-1 and 2 parts by weight ALMA. The mixture (M1) was combined with water and SLS (2.5% DS-4 by weight based on total weight of final polymer) by using a LIGHTNIN™ mixer (SPXFLOW Company) fitted with a cowless blade and mixing for ten minutes at 500 RPM. This was done to ensure homogeneity prior to high shear. The mixture was then passed through a model M-110Y MICROFLUID-IZER™ homogenizer (Microfluidics Corp.) three times at 15,000 PSI to ensure the targeted particle size was acquired. It is contemplated that larger batches could be made, if desired, with commercially-available larger-size homogenizers. The amount of mixture M1 was 40% by weight based on the weight of emulsion E1. The emulsion E1 was transferred to a round bottom flask and polymerized with a redox initiation system of t-butyl hydroperoxide (tBHP) (0.2% by weight based on total weight of final polymer), iron-EDTA (10 ppm by weight iron total weight of final polymer) and sodium formaldehyde sulfoxylate (SFS) (0.2% by weight based on total weight of final polymer. This stage was heated to 40° C. The result was a dispersion of core polymer (IIa) particles.

Next, an emulsion of BA/ALMA was made, with weight ratio 99.3/0.7. This emulsion was divided into three parts and added to the dispersion of core polymer (IIa) particles in three shots, while the temperature was maintained between 40° C. and 70° C. The result of this polymerization was latex (L1), a dispersion that contained core polymer (Ia) particles and core polymer (IIa) particles.

An emulsion of MMA was made and gradually added to latex (L1), while the mixture was maintained at 60° C. The result was a dispersion of the collection of polymer particles of the present invention, dispersed in water. The dispersion was then freeze dried to obtain the polymeric particles in solid form.

The weight proportions were as follows:
10% hybrid core polymer (IIa)
75% acrylic core polymer (Ia)
15% total of all shell polymer (Ib and IIb)

EXAMPLE 2 (SILICONE/ACRYLIC CORE POLYMER (IIA)

Example 1 was repeated, except that the weight proportions within core polymer (IIa) were TSO-1/BA/ALMA=50/49.5/0.5, and the weight proportions of the stages were as follows:

20% hybrid core polymer (IIa)
65% acrylic core polymer (Ia)
15% total of all shell polymer (Ib and IIb)

Compositions of Examples 1 and 2 are summarized in Table 1. "Shell" means the sum of shell polymer (Ib) and shell polymer (IIb).

TABLE I

Compositions of Example 1 and Example 2

| Ex-ample | polymer (IIa) | | | polymer (Ia) | | shell | | Stage wt ratio |
|---|---|---|---|---|---|---|---|---|
| | TSO-1 | BA | ALMA | BA | ALMA | BA | MMA | IIa/Ia/shell |
| 1 | 98 | 0 | 2 | 99.3 | 0.7 | 0 | 100 | 10/75/15 |
| 2 | 50 | 49.5 | 0.5 | 99.3 | 0.7 | 10 | 90 | 20/65/15 |

The percent of grafted shell polymer was analyzed by soluble fraction and NMR analysis as described above. The results were as follows in Table II.

TABLE II percent grafted shell polymer

| Example | % grafted shell polymer |
|---|---|
| 1 | 62.4% |
| 2 | 62.7% |

EXAMPLE 3—COLOR AND IMPACT TESTING

Dried powder of various impact modifiers were blended with a matrix polymer formulation in which the matrix polymer was SAN. The amount of impact modifier was 40% by weight based on the weight of the formulation. The formulation also included carbon black. The formulation was extruded in a Leistritz™ twin screw extruder and then injection molded into samples for color and impact testing.

Color was assessed using the CIE L*a*b method defined by the International Commission on Illumination. The measurement produces three parameters, L*, a*, and b*. For all three parameters, lower numbers are more desirable, because lower numbers demonstrate less development of color through degradation or other undesirable processes.

Impact resistance was tested by the notched Izod impact test (ASTM D256, American Society of Testing and Materials, Conshohocken PA, USA) at 23° C. Ten replicate samples were tested for each example. Impact results are (1) the energy required to break the sample and (2) the percentage of the replicate samples that broke in a ductile fashion rather than a brittle fashion. Higher energy and higher percent ductile breaks each indicate better impact resistance. Color and impact results are shown in Table III. The comparative impact modifiers tested were as follows:

CAIM=commercial all-acrylic impact modifier
CSiAIM=commercial silicone/acrylic impact modifier, having structure that is different from that of the collection of polymer particles of the present invention.

TABLE III

Color and Impact Results

| Example | Energy (J/m) | Ductility | L* | a* | b* |
|---|---|---|---|---|---|
| CAIM | 101 | 0% | 31.9 | 0.12 | 2.56 |
| CSiAIM | 125 | 100% | 26.9 | −0.20 | −1.73 |
| 1 | 134 | 100% | 28.4 | −0.12 | −2.05 |
| 2 | 148 | 100% | 28.4 | −0.38 | 02.42 |

The Example 1 and Example 2 showed better impact and better color than the commercial all-acrylic impact modifier, and they showed better impact with comparable color to the commercial silicone/acrylic impact modifier.

EXAMPLE 4: ATOMIC FORCE MICROSCOPY (AFM)

Examples 1 and 2 were tested as follows. An aqueous dispersion of polymer particles was freeze dried to produce a collection of the polymer particles in solid form. The solid sample was pressed into a film, and the surface was studied by AFM. Both samples showed three phases: a phase rich in silicone, a phase rich in poly(BA), and a phase rich in poly(MMA). In Example 1, the size of the domains of the phase rich in silicone were larger than in Example 2.

The invention claimed is:

1. A collection of polymer particles comprising
(I) a plurality of acrylic particles (I) each comprising
   (a) an acrylic core polymer (Ia) comprising
      (i) polymerized units of one or more monovinyl acrylic monomers (Iai),
      (ii) polymerized units of one or more Si-free graftlinkers (Iaii),
      wherein the weight ratio of the polymerized units of the monovinyl acrylic monomer (Iai) to the polymerized units of the Si-free graftlinker (Iaii) is 32:1 or greater, and
      wherein a sum of the weights of the polymerized units of the one or more monovinyl acrylic monomers (Iai) and the polymerized units of the one or more Si-free graftlinkers (Iaii) is 90% or more by weight based on the weight of the acrylic core polymer (Ia);
   (b) a shell polymer (Ib) comprising polymerized units of one or more acrylic monomers (Ib),
(II) a plurality of hybrid polymer particles (II), each comprising
   (a) a core polymer (IIa) comprising
      (i) polymerized units of one or more monomers (IIai) selected from monomers of structure (Y), monomers of structure (Z), and mixtures thereof,

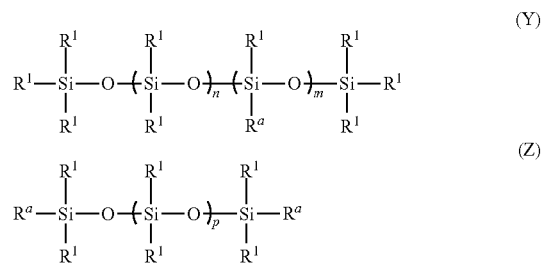

wherein every $R^1$ is independently hydrogen or a hydrocarbon group; n is 0 to 1,000; m is 2 to 1,000; p is 0 to 1,000; every $R^a$ is independently an organic group that contains one or more ethylenically unsaturated group;
      (ii) optionally, polymerized units of one or more monovinyl acrylic monomers (IIaii); and
      (iii) polymerized units of one or more Si-free graftlinkers (IIaiii),
   wherein the amount of the polymerized units of the one or more monomers (IIai) is 40% or more by weight based on the weight of core polymer (IIa);
   (b) a shell polymer (IIb) comprising polymerized units of one or more acrylic monomers (IIb).

2. The collection of polymer particles of claim 1, wherein core polymer (IIa) is present in an amount of 30% to 90% by weight, based on the sum of the weight of acrylic polymer particles (I) plus the weight of hybrid polymer particles (II);
wherein core polymer (Ia) is present in an amount of 5% to 50% by weight, based on the sum of the weight of acrylic polymer particles (I) plus the weight of hybrid polymer particles (II);
wherein the sum of the weights of shell polymer (Ib) plus the weight of the shell polymer (IIb) is present in an amount of 4% to 20% by weight, based on the sum of the weight of acrylic polymer particles (I) plus the weight of hybrid polymer particles (II).

3. The collection of polymer particles of claim 1, wherein the calculated Tg of core polymer (Ia) is −80° C. to 0° C.;
wherein the calculated Tg of core polymer (IIa) is −150° C. to −81° C.;
wherein the calculated Tg of shell polymer (Ib) is 40° C. to 120° C.;
wherein the calculated Tg of shell polymer (IIb) is 40° C. to 120° C.

4. The collection of polymer particles of claim 1, wherein the composition of shell polymer (Ib) is the same as the composition of shell polymer (IIb).

5. A polymer composition comprising styrene/acrylonitrile and the plurality of polymer particles of claim 1, wherein the polymer particles of claim 1 are present in an amount of 10% to 50% by weight based on the weight of the polymer composition.

\* \* \* \* \*